United States Patent
Payne et al.

(10) Patent No.: US 7,202,988 B1
(45) Date of Patent: Apr. 10, 2007

(54) DIFFRACTIVE LIGHT MODULATOR

(75) Inventors: Alexander P. Payne, Ben Lomond, CA (US); Michael J. Dueweke, Santa Clara, CA (US); Wilhelmus De Groot, Palo Alto, CA (US); David T. Amm, Sunnyvale, CA (US); Omar S. Leung, Palo Alto, CA (US); James A. Hunter, Campbell, CA (US); Brent D. Lunceford, Austin, TX (US); Gregory Beach, Georgetown, TX (US)

(73) Assignee: Silicon Light Machines Corporation, San Jose, CA (US)

( * ) Notice: Subject to any disclaimer, the term of this patent is extended or adjusted under 35 U.S.C. 154(b) by 27 days.

(21) Appl. No.: 10/811,435

(22) Filed: Mar. 25, 2004

Related U.S. Application Data

(60) Provisional application No. 60/458,761, filed on Mar. 28, 2003.

(51) Int. Cl.
*G02B 26/00* (2006.01)
*G02B 26/08* (2006.01)
*G02F 1/29* (2006.01)

(52) U.S. Cl. ............... 359/291; 359/290; 359/224; 359/298

(58) Field of Classification Search ........... 359/291, 359/290, 237, 292, 298, 295, 224, 572, 573
See application file for complete search history.

(56) References Cited

U.S. PATENT DOCUMENTS

| | | | | |
|---|---|---|---|---|
| 4,441,791 A | * | 4/1984 | Hornbeck | ............. 359/295 |
| 6,215,579 B1 | | 4/2001 | Bloom et al. | |
| 6,829,077 B1 | * | 12/2004 | Maheshwari | ............. 359/291 |
| 2002/0141039 A1 | * | 10/2002 | Mermelstein et al. | ....... 359/305 |

OTHER PUBLICATIONS

D.T. Amm, et al. "Grating Light Valve Technology: Update and Novel Applications" May 19, 1998, pp. 1-4, Silicon Light Machines. Presented at Society for Information Display Symposium, Anaheim, CA.

(Continued)

*Primary Examiner*—Alicia M. Harrington
*Assistant Examiner*—Brandi Thomas
(74) *Attorney, Agent, or Firm*—Okamoto & Benedicto LLP

(57) ABSTRACT

In one embodiment disclosed, a light modulator can be configured to have a substantially flat optically active modulator element portion while deflected. The modulator can include a plurality of modulator elements arranged substantially in parallel, with each modulator element including an optically active portion and a support portion on either side of the optically active portion. Further, the optically active portion can have a narrower width than the support portion. In another embodiment disclosed, a movable membrane for light modulation includes a substantially circular optically active portion and a released membrane portion surrounding the circular optically active portion. The substantially circular optically active portion can also include a plurality of gaps configured to expose a lower surface. Further, the substantially circular optically active portion can be essentially flat while in a deflected state.

7 Claims, 6 Drawing Sheets

OTHER PUBLICATIONS

David T. Amm, et al. "Optical Performance of the Grating Light Valve Technology" 1999, pp. 1-8, Silicon Light Machines. Presented at Photonics West-Electronics Imaging.

R.W. Corrigan, "An Alternative Architecture for High Performance Display" Nov. 20, 1999, pp. 1-5, Silicon Light Machines. Presented at SMPTE Technical Conference and Exhibition, New York, NY.

R.W. Corrigan, et al. "Calibration of a Scanned Linear Grating Light Valve Projection System" May 18, 1999, pp. 1-4, Silicon Light Machines. Presented at Society for Information Display Symposium, San Jose, CA.

Robert Corrigan, et al. Silicon Light Machines—Grating Light Valve Technology Brief, Jun. 2001 ver C. pp. 1-8; Sunnyvale, California.

* cited by examiner

DIFFRACTIVE LIGHT MODULATOR

CROSS-REFERENCE TO RELATED APPLICATIONS

The present application claims the benefit of U.S. Provisional Application No. 60/458,761, filed Mar. 28, 2003 by inventors Alexander Payne et al. and entitled "High Speed Diffractive Light Modulator." The disclosure of U.S. Provisional Application No. 60/458,761 is hereby incorporated by reference in its entirety.

BACKGROUND OF THE INVENTION

1. Field of the Invention

The present invention relates generally to micro electromechanical systems (MEMS) and, more particularly, to diffractive light modulators.

2. Description of the Background Art

A MEMS or micro electromechanical (MEM) device typically includes micromechanical structures or light modulators that may be actuated using electrical signals. The light modulators may comprise, for example, Grating Light Valve™ (GLV™) light modulators available from Silicon Light Machines, Sunnyvale, Calif. (GLV™ and Grating Light Valve™ are trademarks of Silicon Light Machines). A light modulator may include an array of moveable structures referred to as "ribbons." Light modulators may be used in various applications, including video, printing, optical switching, and maskless lithography, as just a few general examples.

FIG. 1 illustrates a conventional diffracting element surface structure 100 that can be part of a light modulating device. This structure includes two surface levels, with one generally movable and one generally fixed. These are labeled as "upper" 102 and "lower" 104 reflecting surfaces in FIG. 1. Each of these surfaces has substantially equal area and equal reflectivity properties. Also, the height difference between each surface (i.e., in the direction of the light to be modulated) is changed to modulate the relative phase difference for light reflected from each surface. If, upon reflection, the light from both surfaces is "in phase," then the $0^{th}$ order light reflection is effectively maximized. If, upon reflection, the light from both surfaces is "out of phase," then the $0^{th}$ order light reflection is effectively minimized. To minimize the $0^{th}$ order reflection, the height difference can be $1\lambda/4$, $3\lambda/4$, $5\lambda/4$, $7\lambda/4$ or $9\lambda/4$, etc., where $\lambda$ is the wavelength of the incident light. To maximize the $0^{th}$ order reflection, the height difference can be $2\lambda/4$, $4\lambda/4$, $6\lambda/4$, $8\lambda/4$ or $10\lambda/4$ etc. These maximum and minimum $0^{th}$ order reflectivities may only be realized with an optical system that can appropriately discriminate between various diffraction orders. Typically, within one modulating element, the spatial frequency of these surfaces must be greater than that of the modulating element. In many implementations, it is at least twice as much. For the example case illustrated in FIG. 1, a "pixel" can include at least 2 upper surface reflecting features and 2 lower reflecting surfaces. Similarly, optical systems can be built which may select diffracted light, and the diffracted light can be modulated from about a maximum to about a minimum value in the same manner.

FIG. 2 is an illustration of a conventional light modulator in both cross section and top view. This represents a very particular example implementation where "ribbons" are used as modulator elements. In this example, the ribbons 202 and gaps 204 are the same width. Also, the ribbons 202 and gaps 204 are typically a uniform width for their entire length. Further, the gaps 204 and ribbons 202 are typically covered with the same reflecting material 206, which can be Aluminum or other reflective-material. The height difference, as related to the cross section diagram, is initially controlled by the film thickness choice. The height difference (and hence the reflective or diffractive condition of the modulator element) can be changed by controllably deflecting the ribbons 202 by up to about $\lambda/4$, where $\lambda$ is the wavelength of the incident light. Here, It is assumed that the light is at or near normal incidence, i.e., perpendicular to the plane of the device. Accordingly, in the cross section diagram, the light direction would be from the top of the page to the bottom of the page. In the top view diagram, the light direction would be onto the page in a direction normal to the page.

FIG. 3 shows an illumination profile 301 for a conventional diffractive element 300. When the ribbons 302 are deflected, they are approximately parabolic in shape, as shown, along their length. The center portion 304 of the ribbons 302, perhaps the middle third, has a relatively flat profile, and this deflection 306 may be set to $\lambda/4$. However, the entire ribbon or diffractive element length does not have a uniform deflection. In fact, the section near the support posts 308 on either side does not deflect at all. Thus, the best optical condition can only be achieved in the middle region 304 of the ribbon 302. In practice, the optical illumination can be substantially restricted to this central region 304. This is typically referred to as the "sweet spot" or "optically active area." In order to achieve both high efficiency and contrast, the light must be restricted to approximately the middle ⅓ of the ribbon or diffractive element length.

It would be desirable to have a light modulator design that included diffractive elements optimized to take advantage of the limited optically active areas for improved overall modulator performance.

SUMMARY

In one embodiment, a light modulator can be configured to have a substantially flat optically active modulator element portion while deflected. The modulator can include a plurality of modulator elements arranged substantially in parallel, with each modulator element including an optically active portion and a support portion on either side of the optically active portion. Further, the optically active portion can have a narrower width than the support portion.

In another embodiment, a movable membrane for light modulation includes a substantially circular optically active portion and a released membrane portion surrounding the circular optically active portion. The substantially circular optically active portion can also include a plurality of gaps configured to expose a lower surface. Further, the substantially circular optically active portion can be essentially flat while in a deflected state.

DETAILED DESCRIPTION

Described herein are embodiments suitable for modulating incident light beams on a light modulator. In the interest of clarity, not all features of an actual implementation are described in this specification. It will be appreciated that, in the development of any such actual embodiment, numerous implementation-specific decisions must be made to achieve the developers' specific goals. Such details might include compliance with system-related and business-related constraints, which will vary from one implementation to another, for instance. Moreover, it will be appreciated that such a development effort, even if complex and time-consuming, would be a routine undertaking for those of ordinary skill in the art having the benefit of this disclosure.

Figure 1:
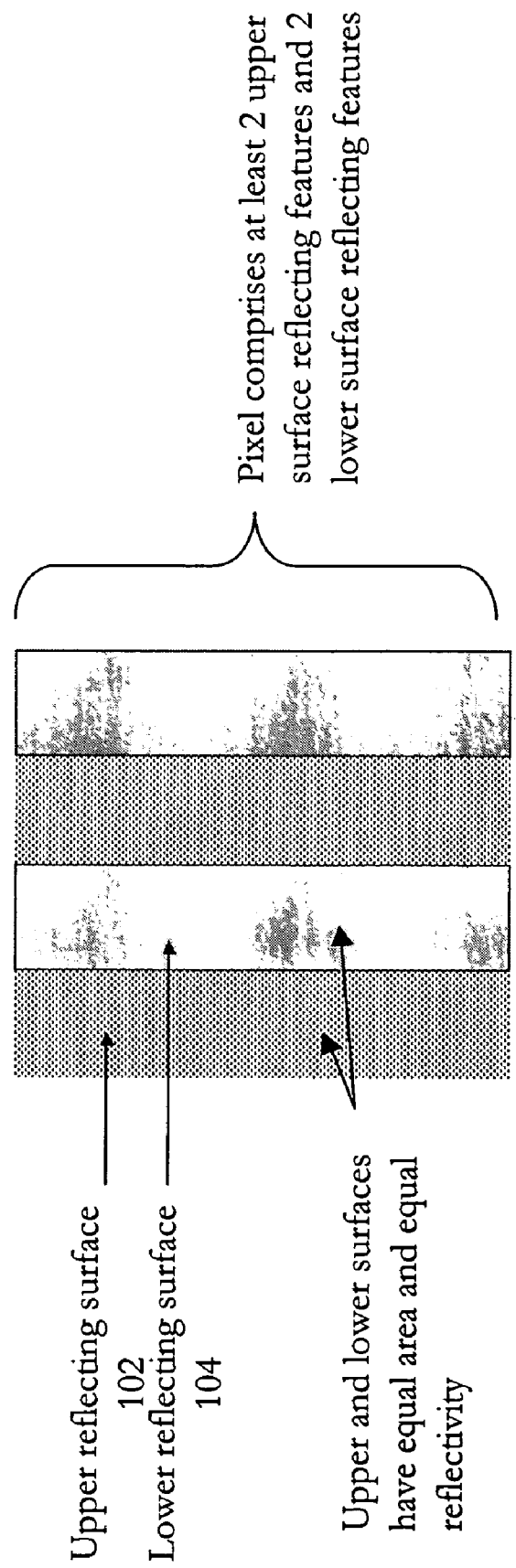
FIG. 1 illustrates a conventional diffracting element surface structure.
Figure 2:
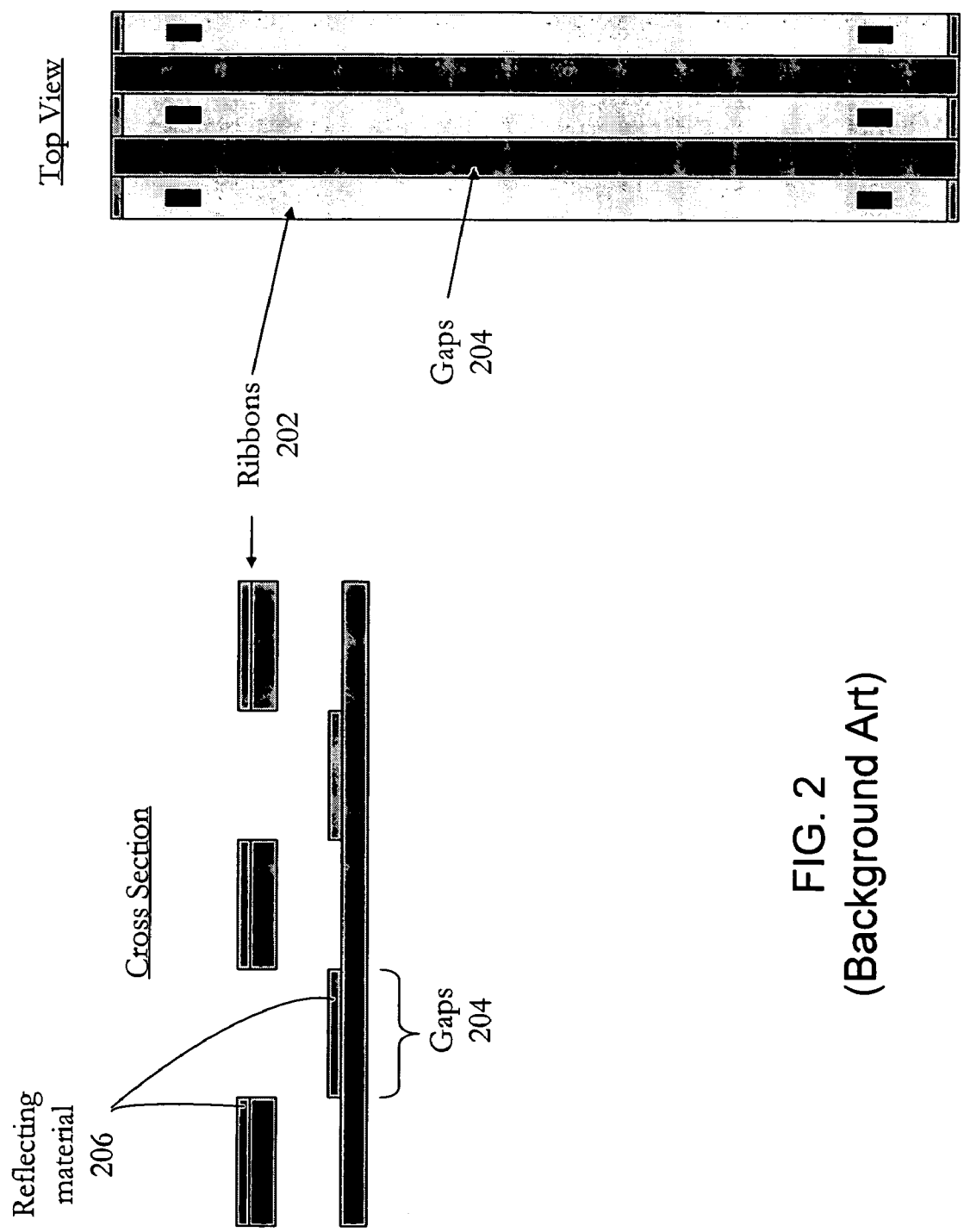
FIG. 2 is an illustration of a conventional light modulator in both cross section and top view.
Figure 3:
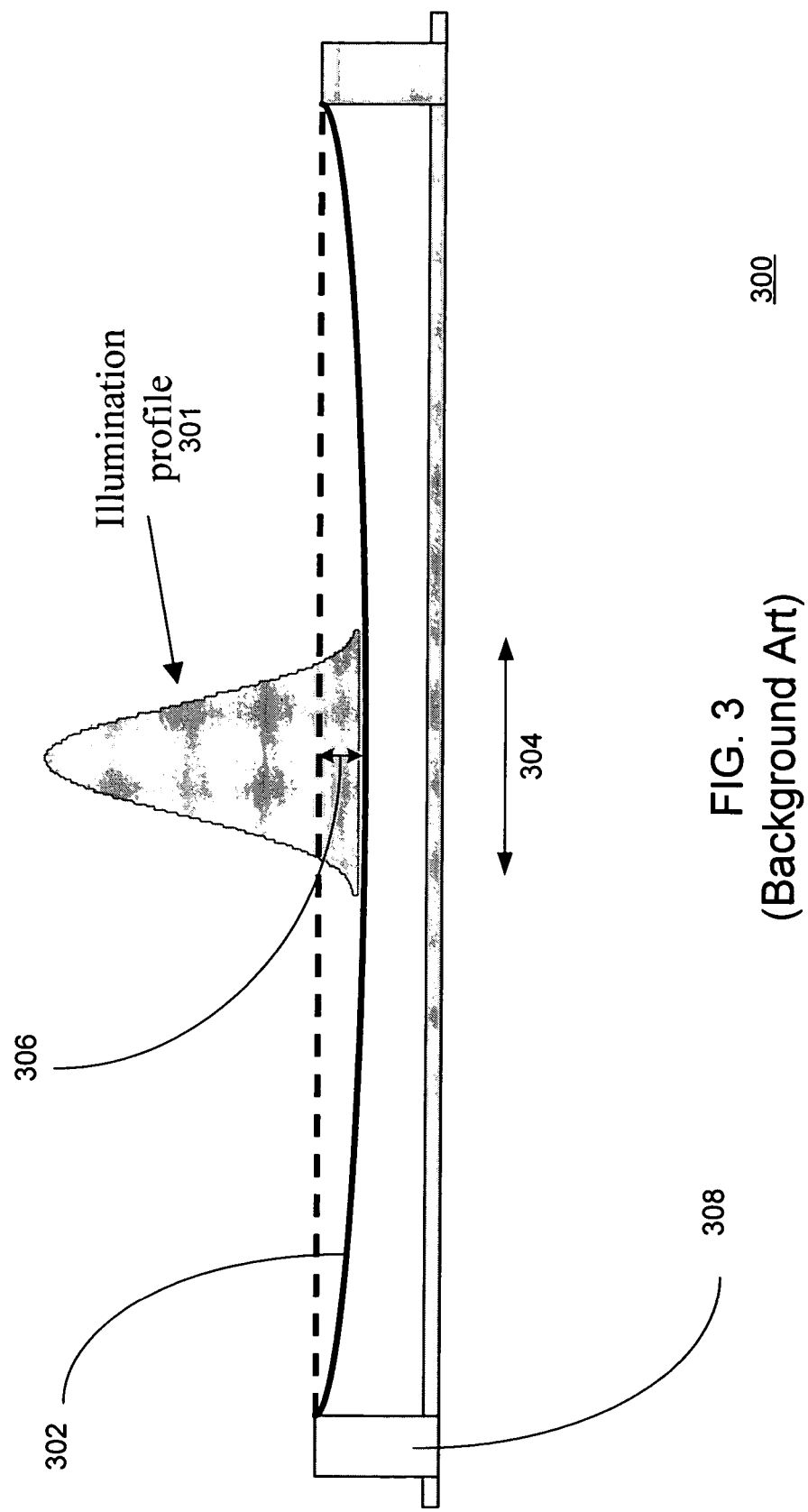
FIG. 3 shows an illumination profile for a conventional diffractive element.
Figure 4:
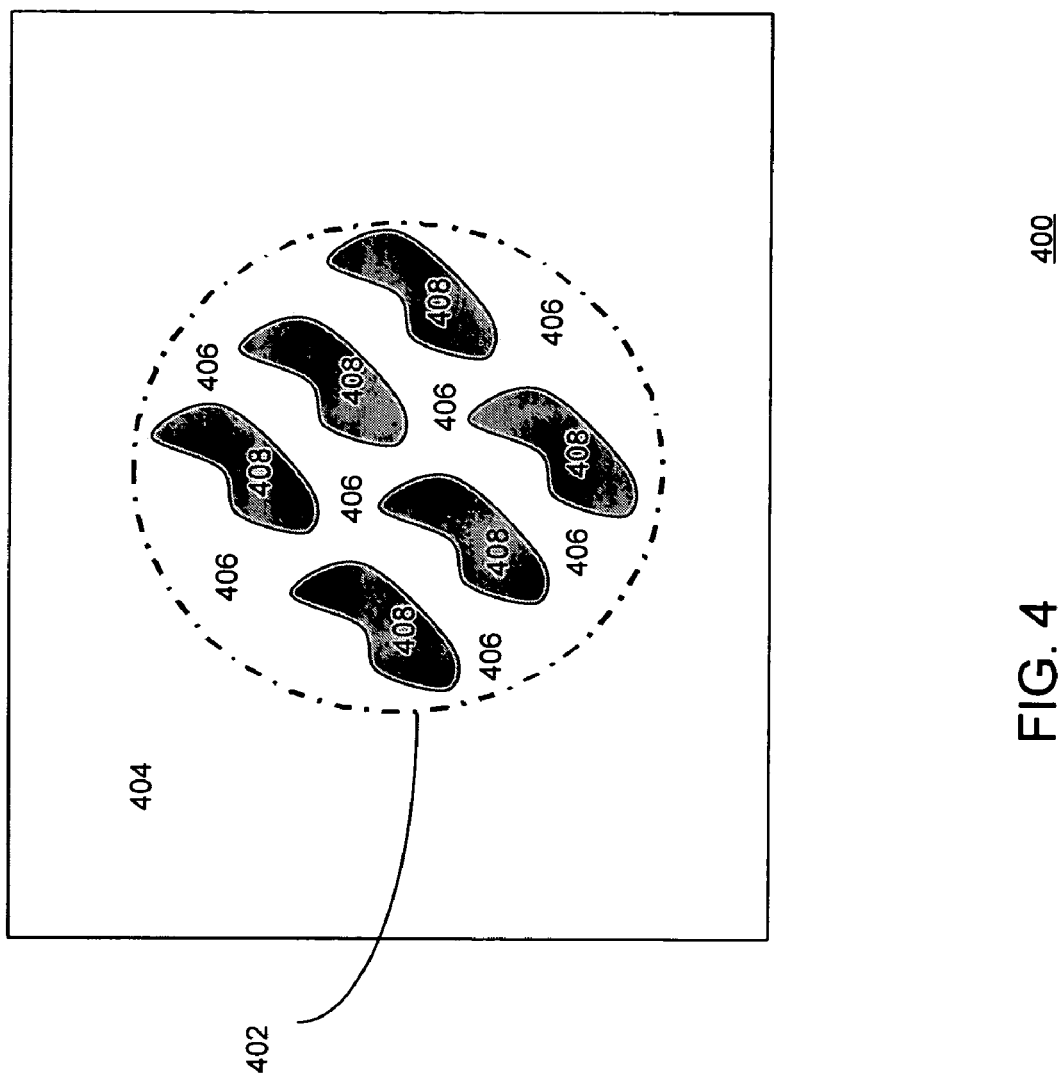
FIG. 4 is a diagram showing an optical area and a released membrane area.

FIG. 4 is a diagram showing an optical area (inside the dot-dash circle) 402 and a released membrane area (outside the dot-dash circle) 404 of a device 400. Similar to the ribbon diffractive element example case described above, because the center portion of the ribbon or membrane is the optically active area 402, this area 402 may be weighted equally between the upper surface 406 and lower surface 408. In particular, a substantially equal optical energy (i.e., a product of area times a reflectivity) may be created. For example, the upper surface 406 may comprise a center portion of a membrane, and the lower surface 408 may comprise areas of a reflective substrate below the multiple openings or gaps in the membrane. FIG. 4 depicts arbitrarily-shaped openings or gaps to illustrate that such openings may be of various shapes. Along these lines, the optically active area 402 is the only area that would actually benefit from having a uniform cross section (i.e. flat surfaces).

The remaining ribbon or membrane area 404 can be used to tailor or optimize for other properties of the device. For example, the device switching speed can be optimized by taking advantage of this portion of these device properties. Here, a diffracting light modulator device is described. The modulator can include maintaining respective areas of the upper membrane 406 and lower surface 408 in equal ratios only in the optically active region. In particular, a substantially equal optical energy (i.e., a product of area times a reflectivity) may be created. Along these lines, the membrane design in other areas can be freed from optical constraints. Accordingly, this portion of the design can then be optimized to enhance the modulator performance, such as the modulator speed.

Figure 5:
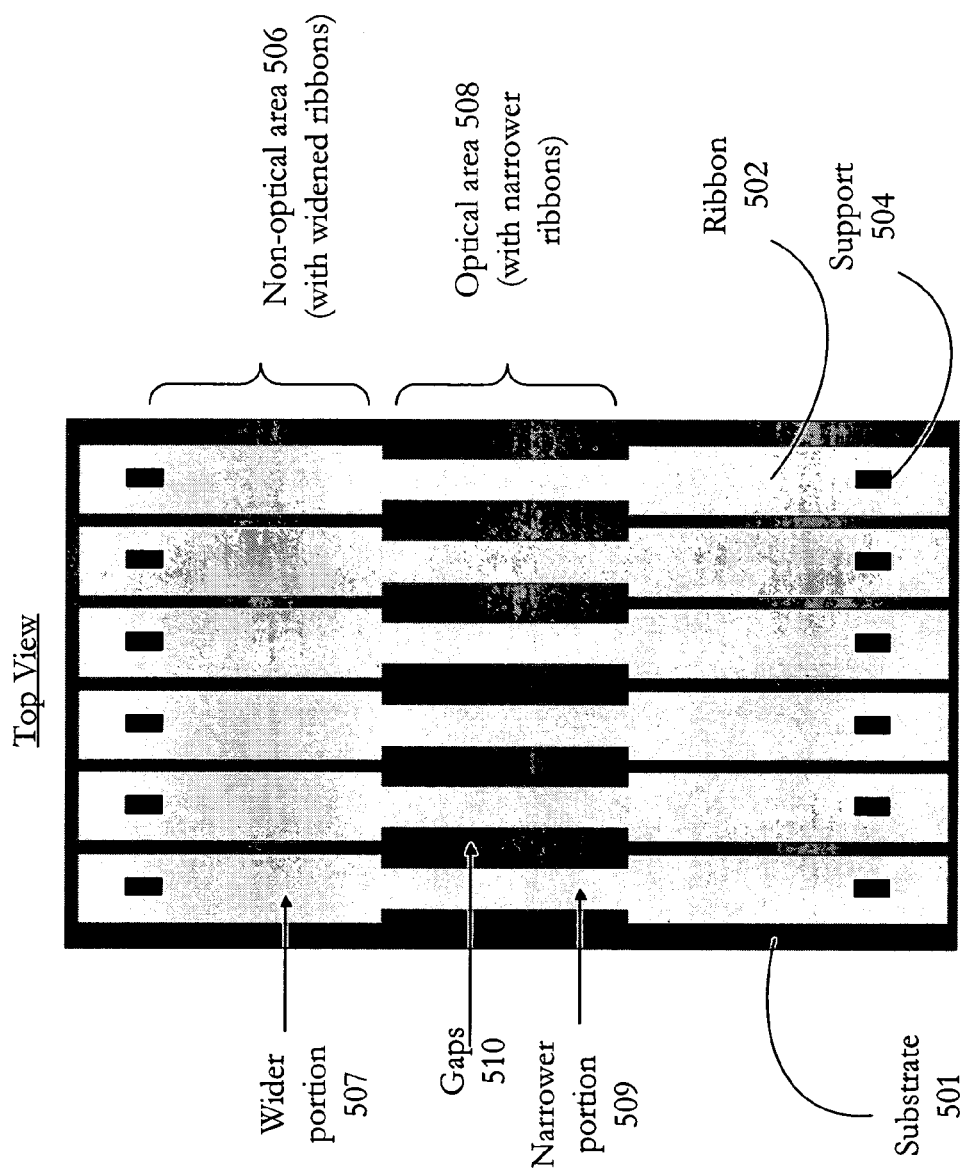
FIG. 5 is a top view of a light modulator structure according to a first embodiment.

FIG. 5 is a top view of a light modulator structure 500 according to a first embodiment. This particular example includes ribbon-type diffractive elements 502 fabricated to be situated above a substrate 501. In this example, the ribbons 502 are configured to be wider 507 near the support structures 504. This results in more pull-down force in this non-optical region 506 because the controllably-induced force (for example, a controlled electrostatic force) that pulls-down the ribbons 502 is typically proportional to the surface area of the region. This can result in more bending of the ribbons 502 at their wider (and more substantial) portions 507 in this non-optical area 506, but less bending of the ribbons at their narrower portions 509 in the optical area 508, as compared to a previous constant width ribbon type of design. The central portion or optically active area 508 includes the thinner reflective ribbon portions and the gaps 510 therebetween opening to a reflective surface below.

Because of this increased bending in the non-optical portion 506, the narrower portions 509 of the ribbons in the optically active area 508 can be substantially flat in this design. This can result in improved modulator contrast and efficiency. Larger ribbon widths typically also increase the damping of the ribbons motions, which can advantageously enable higher speed operation of the modulator.

Figure 6:
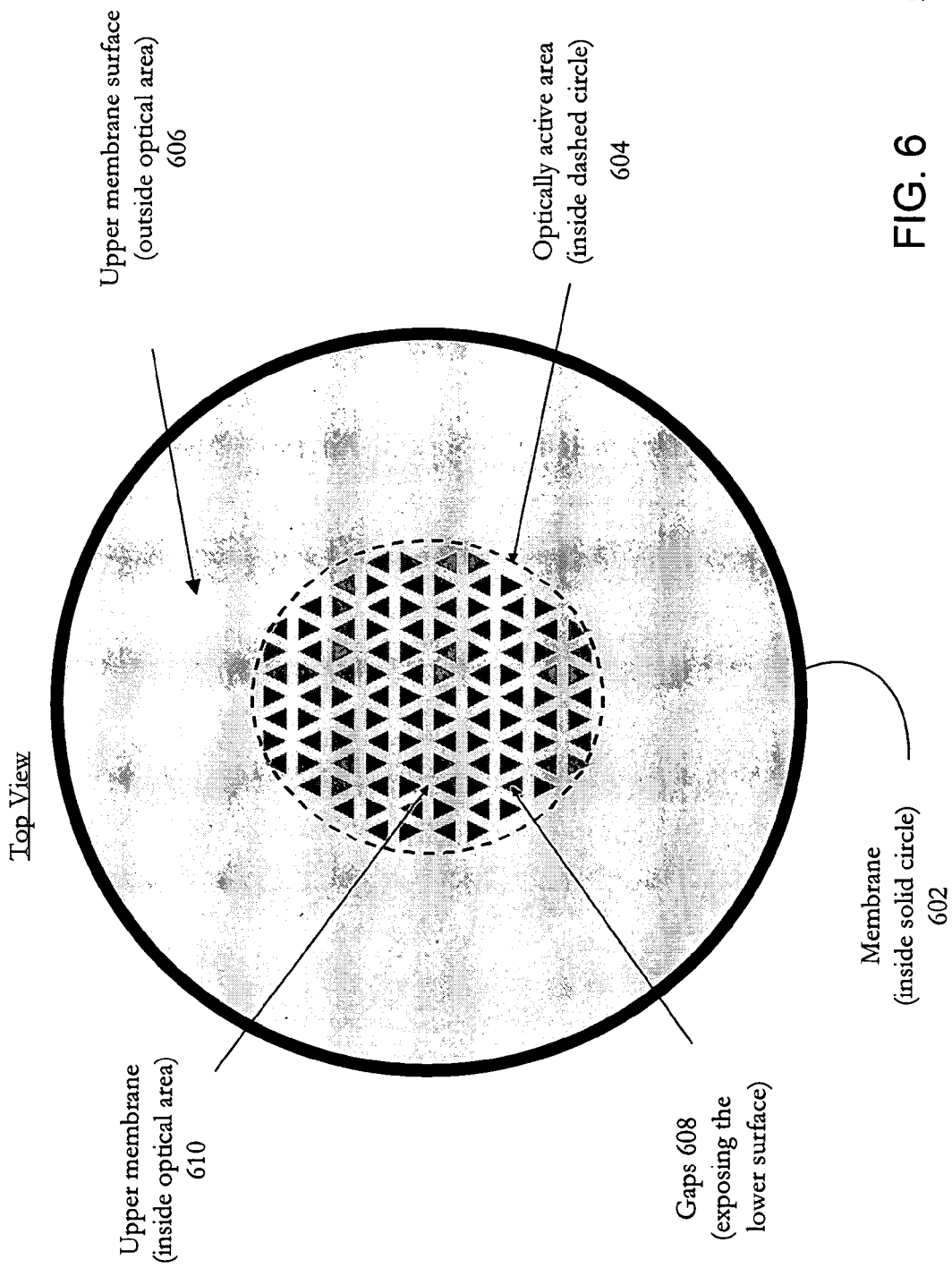
FIG. 6 is a top view of a light modulator structure according to a second embodiment.

FIG. 6 is a top view of a light modulator structure 600 according to a second embodiment. This embodiment includes a substantially circular movable membrane 602. The membrane 602 comprises a compliant material. For example, the membrane 602 may be constructed using a polymeric material, or a metallic material, or a polycrystalline or amorphous material.

The central portion 604 of device may be configured to be illuminated by an incident light beam, so it is an optically active area. The other (non-optically active) regions 606 may surround the central portion 604 and can be designed to optimize for speed and/or damping characteristics. In order to obtain high device switching speed, the device can be configured for high resonant frequency and high damping characteristics. Overall, the design can provide for a substantially flat optically active area 604. The area 606 outside of the optical "sweet spot" can be designed (perhaps, for example, with appropriately configured gaps) to mitigate any "overfill" of the optical area 604 by the illumination system.

The optically active area 604 in FIG. 6 is shown to include gaps (holes) 608 in the reflective upper membrane 610 within that area 604 to expose the lower reflective surface. The reflectivity of the upper membrane and the lower surface may be provided by a layer of reflective material, such as aluminum or other metal. These are shown as triangular in shape, but they could be rectangular, circular, rectangular, square, or any suitable shape. Also, the membrane in general, although shown as substantially circular, could also be implemented in a rectangular or substantially any suitable shape. The array of openings in the membrane may be configured to have various symmetries, including 2-fold, 3-fold, 4-fold, 6-fold, or n-fold symmetries. Specifically, for example, the array of openings may be in a two-dimensional version of a "simple cubic" array, or in a two-dimensional version of a "face centered cubic" array, or in other forms of two-dimensional arrays.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A micro electromechanical system (MEMS) device capable of light modulation, the device comprising:
   a membrane configured to be controllably deflected;
   a support structure configured to support the membrane;
   an optically-active portion of the membrane that is reflective and configured to be illuminated;
   a non-optically-active portion of the membrane between the optically-active portion and the support structure;
   a plurality of gaps in the optically-active portion of the membrane; and
   a substrate below the membrane having reflective areas under the plurality of gaps,
   wherein the gaps in the optically-active membrane portion are configured so that substantially equal optical energies are reflected from the membrane and from the substrate below the membrane.

2. The device of claim 1, wherein the non-optically-active membrane portion is substantially larger in area than the optically-active membrane portion.

3. The device of claim 2, wherein the optically-active membrane portion bends less than the non-optically-active membrane portion when the membrane is controllably deflected.

4. The device of claim 3, wherein the optically-active membrane portion remains substantially flat when the membrane is controllably deflected.

5. The device of claim 1, wherein both the optically-active membrane portion and the reflective areas under the gaps are covered with a same reflective material.

6. The device of claim 5, wherein the reflective material comprises aluminum.

7. The device of claim 1, wherein the membrane comprises a compliant material from a group of compliant materials including polymeric materials, metals, polycrystalline materials, and amorphous materials.

* * * * *